United States Patent
Harnik et al.

(10) Patent No.: US 10,628,433 B2
(45) Date of Patent: *Apr. 21, 2020

(54) LOW MEMORY SAMPLING-BASED ESTIMATION OF DISTINCT ELEMENTS AND DEDUPLICATION

(71) Applicant: International Business Machines Corporation, Armonk, NY (US)

(72) Inventors: Danny Harnik, Tel Mond (IL); Ety Khaitzin, Holon (IL); Dmitry Sotnikov, Rishon-Lezion (IL)

(73) Assignee: International Business Machines Corporation, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/121,696

(22) Filed: Sep. 5, 2018

(65) Prior Publication Data

US 2019/0005099 A1    Jan. 3, 2019

Related U.S. Application Data

(63) Continuation of application No. 14/994,163, filed on Jan. 13, 2016, now Pat. No. 10,162,867.

(51) Int. Cl.
*G06F 16/2458*    (2019.01)

(52) U.S. Cl.
CPC ............................... *G06F 16/2462* (2019.01)

(58) Field of Classification Search
None
See application file for complete search history.

(56) References Cited

U.S. PATENT DOCUMENTS

| 5,542,089 A | 7/1996 | Lindsay et al. |
| 8,615,499 B2 | 12/2013 | Chambliss et al. |
| 8,793,226 B1 | 7/2014 | Yadav et al. |
| 9,152,333 B1 | 10/2015 | Johnston et al. |

(Continued)

FOREIGN PATENT DOCUMENTS

WO    2007127360    11/2007

OTHER PUBLICATIONS

Qi George Zhao et al., "Data streaming algorithms for accurate and efficient measurement of traffic and flow matrices", Data streaming algorithms for accurate and efficient measurement of traffic and flow matrices.

(Continued)

*Primary Examiner* — Wilson Lee
(74) *Attorney, Agent, or Firm* — Daniel Kligler

(57) ABSTRACT

Methods, computing systems and computer program products implement embodiments of the present invention that include partitioning a dataset into a full set of logical data units, and selecting a sample subset of the full set, the sample subset including a random sample of the full set based on a sampling ratio. A set of target hash values are selected from a full range of hash values, and, using a hash function, a respective unit hash value is calculated for each of the logical data units in the sample subset. A histogram is computed that indicates a duplication count of each of the unit hash values that matches a given target hash value, and based on the histogram, a number of distinct logical data units in the full set is estimated.

20 Claims, 3 Drawing Sheets

(56) References Cited

U.S. PATENT DOCUMENTS

| | | | |
|---|---|---|---|
| 2006/0085592 A1* | 4/2006 | Ganguly | G06F 17/30498 |
| | | | 711/114 |
| 2014/0052699 A1 | 2/2014 | Harnik et al. | |
| 2014/0304239 A1 | 10/2014 | Lewis et al. | |
| 2015/0379429 A1* | 12/2015 | Lee | G06N 99/005 |
| | | | 706/11 |
| 2015/0379430 A1* | 12/2015 | Dirac | G06N 99/005 |
| | | | 706/12 |
| 2016/0078361 A1* | 3/2016 | Brueckner | G06N 99/005 |
| | | | 706/12 |
| 2017/0193329 A1* | 7/2017 | Suman | G06K 9/6215 |

OTHER PUBLICATIONS

Ashwin Lall et al., "Data Streaming Algorithms for Estimating Entropy of Network Traffic", Proceeding Sigmetrics '06/Performance '06 Proceedings of the joint international conference on Measurement and modeling of computer systems pp. 145-156, 2006.

Danny Harnik et al,, "Estimation of Deduplication Ratios in Large Data Sets", Mass Storage Systems and Technologies (MSST), 2012 IEEE 28th Symposium on Date of Conference: Apr. 16-20, 2012, pp. 1-11.

* cited by examiner

LOW MEMORY SAMPLING-BASED ESTIMATION OF DISTINCT ELEMENTS AND DEDUPLICATION

CROSS-REFERENCE TO RELATED APPLICATIONS

This application is a continuation of U.S. patent application Ser. No. 14/994,163, filed Jan. 13, 2016, which is titled "LOW MEMORY SAMPLING-BASED ESTIMATION OF DISTINCT ELEMENTS AND DEDUPLICATION" the application of which is incorporated herein by this reference as though fully set forth herein.

FIELD OF THE INVENTION

The present invention relates generally distinct element estimation, and specifically to estimating, in a low-memory environment, a number of distinct logical data units in a dataset by analyzing a sample of the dataset.

BACKGROUND

Estimating a number of distinct elements in a large dataset has uses in many disciplines including biology, database analysis and "big data" analysis. For example, the elements might represent IP addresses of packets passing through a router, unique visitors to a web site, elements in a large database, motifs in a DNA sequence, or elements of RFID/sensor networks. In operation, estimating a number of distinct elements in a dataset can be used to estimate a deduplication rate for the dataset.

The description above is presented as a general overview of related art in this field and should not be construed as an admission that any of the information it contains constitutes prior art against the present patent application.

SUMMARY

There is provided, in accordance with an embodiment of the present invention a method, including partitioning a dataset into a full set of logical data units, selecting a sample subset of the full set, the sample subset including a random sample of the full set based on a sampling ratio, selecting, from a full range of hash values, a set of target hash values, calculating, using a hash function, a respective unit hash value for each of the logical data units in the sample subset, computing a histogram indicating a duplication count of each of the unit hash values that matches a given target hash value, and estimating, based on the histogram, a number of distinct logical data units in the full set.

There is also provided, in accordance with an embodiment of the present invention an apparatus, including a storage device configured to store a dataset, and a processor configured to partitioning the dataset into a full set of logical data units, to select a sample subset of the full set, the sample subset including a random sample of the full set based on a sampling ratio, to select, from a full range of hash values, a set of target hash values, to calculate, using a hash function, a respective unit hash value for each of the logical data units in the sample subset, to compute a histogram indicating a duplication count of each of the unit hash values that matches a given target hash value, and to estimate, based on the histogram, a number of distinct logical data units in the full set.

There is further provided, in accordance with an embodiment of the present invention a computer program product, the computer program product including a non-transitory computer readable storage medium having computer readable program code embodied therewith, the computer readable program code including computer readable program code configured to partition a dataset into a full set of logical data units, computer readable program code configured to select a sample subset of the full set, the sample subset including a random sample of the full set based on a sampling ratio, computer readable program code configured to select, from a full range of hash values, a set of target hash values, computer readable program code configured to calculate, using a hash function, a respective unit hash value for each of the logical data units in the sample subset, computer readable program code configured to compute a histogram indicating a duplication count of each of the unit hash values that matches a given target hash value, and computer readable program code configured to estimate, based on the histogram, a number of distinct logical data units in the full set.

BRIEF DESCRIPTION OF THE DRAWINGS

The disclosure is herein described, by way of example only, with reference to the accompanying drawings, wherein.

DETAILED DESCRIPTION OF EMBODIMENTS

When estimating a deduplication ratio using embodiments described in U.S. Patent Application entitled, "Sampling-Based Deduplication Estimation" referenced above, a sample of a dataset is analyzed to estimate the deduplication ratio for the entire dataset. During the analysis, a hash value is calculated for each of the logical data units in the sample and a histogram is created that indicates a duplication count for each of the hash values. When sampling (e.g., 10%-15%) large datasets, analyzing the sample (e.g., 10% of the dataset) may be too large to fit in random access memory (RAM) and either requires excessive amount of RAM (which is very expensive) or requires paging data in and out of disk which can significantly impact the time required to complete the analysis.

Embodiments of the present invention provide methods and systems for low memory sampling-based distinct element estimation for a dataset partitioned into a full set of logical data units. As described hereinbelow, a sample subset of the full set is selected, wherein the sample subset comprising a random sample of the full set based on a sampling ratio. From a full range of hash values, a set of target hash values is selected, and using a hash function, a respective unit hash value is calculate for each of the logical data units in the sample subset. A histogram is computed that indicates a duplication count of each of the unit hash values that matches a given target hash value, and based on the first histogram, a number of distinct logical data units in the full set is estimated.

Systems implementing embodiments of the present invention can significantly reduce I/O operations and memory requirements when estimating numbers of distinct elements in large data sets, thereby enabling deployment of sampling based estimation (i.e., as described in U.S. Patent Application entitled, "Sampling-Based Deduplication Estimation" referenced above) in real-world high-scale systems. Embodiments described herein provide two different approaches for low memory sampling-based estimation. The first approach (referred to herein as a base sample approach) yields higher accuracy and the second approach (referred to herein as a streaming approach) is less accurate but gives easier support for parallelization of the sampling phase (yet keeping all memory and communication levels low). Another advantage of the streaming approach is an ability working with dynamic data sets that may grow over time.

System Description

Figure 1:
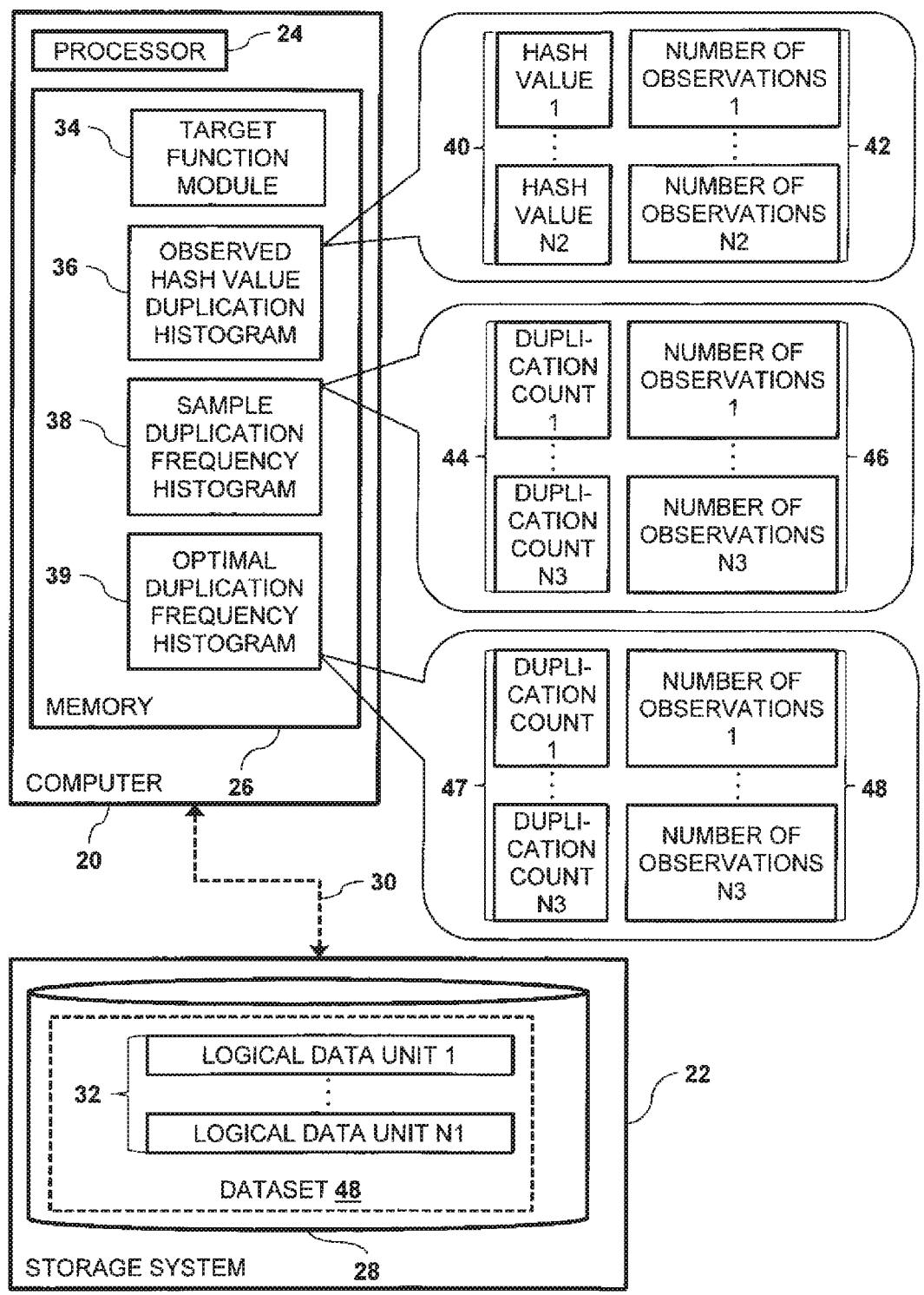
FIG. 1 is a block diagram that schematically illustrates a computer system configured to implement a low memory sampling-based distinct element estimation method, in accordance with an embodiment of the present invention.

FIG. 1 is a block diagram that schematically illustrates a computer 20 configured to perform low memory sampling-based estimation of a number of distinct elements for data stored in a dataset 48 on a storage system 22 in accordance with an embodiment of the present invention. Computer 20 comprises a processor 24 and a memory 26, and storage system 22 comprises one or more storage devices 28 such as hard disk drives or solid-state disk drives. Computer 20 and storage system 22 communicate via a data network connection 30.

Memory 26 stores a target function module 34, an observed hash value duplication histogram 36, a sample duplication frequency histogram 38, and an optimal duplication frequency histogram 39. Observed hash value duplication histogram 36 comprises hash values 40 and corresponding number of observations 42, sample duplication frequency histogram 38 comprises duplication counts 44 and corresponding number of observations 46, and optimal duplication frequency histogram 39 comprises duplication counts 47 and corresponding number of observations 49.

In embodiments described herein, each histogram 36, 38 and comprises (i.e., in a more general mathematical sense) a function $m_i$ that counts the number of observations that fall into each of the disjoint categories (known as bins). Therefore, if we let n be the total number of observations and k be the total number of bins, the histogram $m_i$ meets the following conditions:

$$n = \sum_{i=1}^{k} m_i. \quad (1)$$

As described in U.S. Patent Application entitled, "Sampling-Based Deduplication Estimation" referenced above, processor 24 uses target function module 34, observed hash value duplication histogram 36, and sample duplication frequency histogram 38 to compute optimal duplication frequency histogram 39 which indicates a distinct number of logical data units 32 in dataset 49. In embodiments of the present invention, an estimate of distinct logical data units 32 in dataset 48 comprises a sum of number of observations 49.

While the configuration in FIG. 1 presents dataset 48 segmented into logical data units 32, segmenting the dataset into any type of logical data units that can be analyzed for distinct element estimation is considered to be within the spirit and scope of the present invention. Examples of logical data units that computer 20 can analyzed for distinct element estimation include block logical data units, file system logical data units and object logical data units.

Memory 26 typically comprises high-speed volatile memory such as random access memory (RAM). While the example in FIG. 1 shows histograms 36 and 38 stored entirely in memory 26, other configurations are considered to be within the spirit and scope of the present invention. For example, histograms 36 and 38 can be stored on storage device (not shown) coupled to computer 20, or the histograms can stored using a combination of memory 26 and the storage device.

Processor 24 typically comprises a general-purpose computer, which are programmed in software to carry out the functions described herein. The software may be downloaded to computer 20 in electronic form, over a network, for example, or it may be provided on non-transitory tangible media, such as optical, magnetic or electronic memory media. Alternatively, some or all of the functions of processor 24 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Low Memory Sampling

Figure 2:
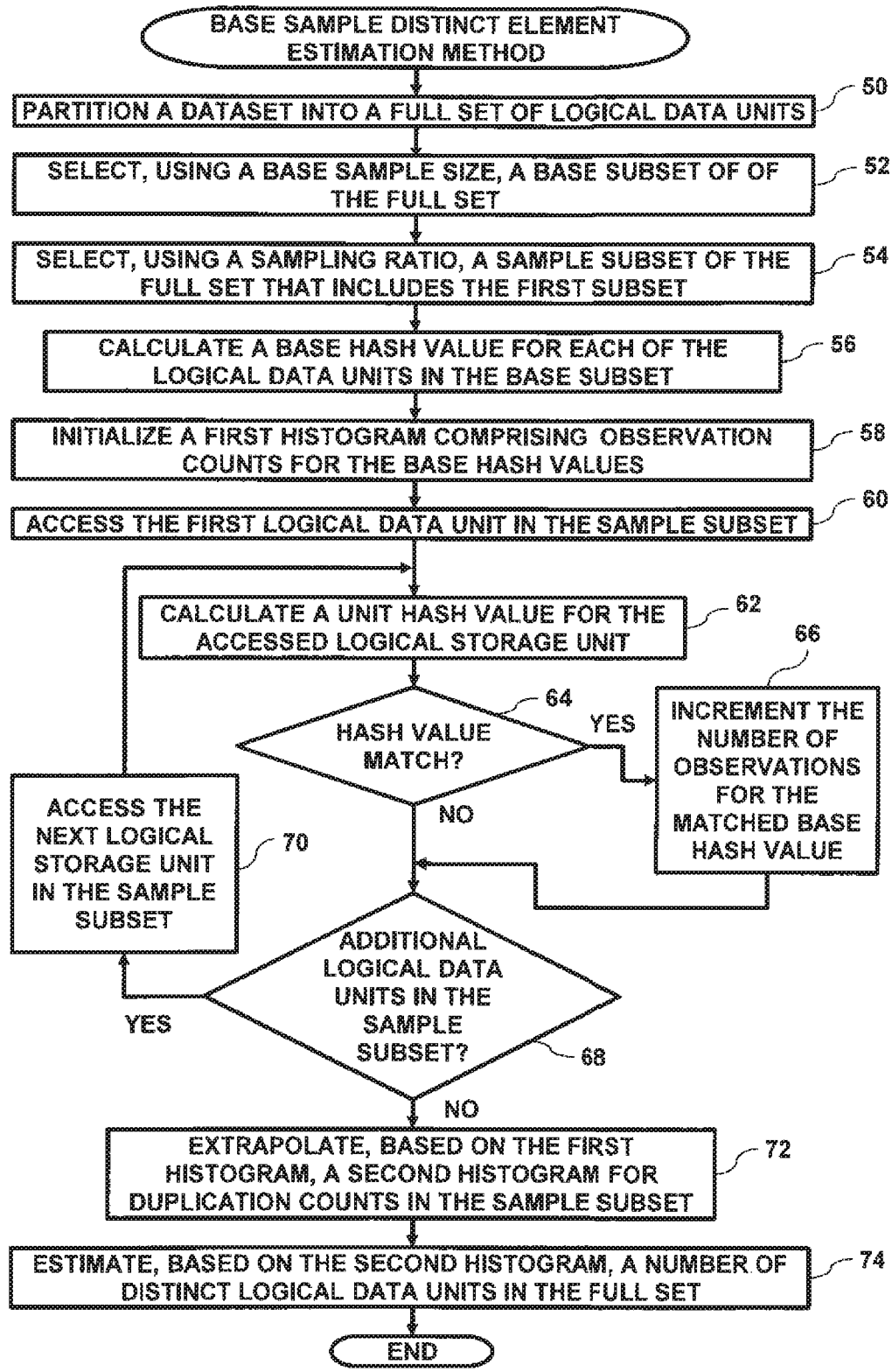
FIG. 2 is a flow diagram that schematically illustrates a method for low memory sampling-based estimation of distinct elements, in accordance with a first embodiment of the present invention.

FIG. 2 is a flow diagram that schematically illustrates a method for low memory sampling-based estimation of a number of distinct logical data units 32 in dataset 48, in accordance with a first embodiment of the present invention. The first embodiment described in the flow diagram shown in FIG. 2 is also referred to herein as a base sample approach.

In a partition step 50, processor 24 partitions dataset 48 into a full set of logical data units 32. In some embodiments, the set of logical data units 32 (also referred to herein as a dataset) comprises a total number of logical data units 32 in storage system 22.

In a first selection step 52, processor 24 selects, using a defined base sample size, a base subset comprising a random subset of logical data units 32, and in a second selection step 54, the processor selects, using a defined sampling ratio, a sample subset comprising a random subset of the full set that includes the base set. In embodiments described herein, processor 24 can select the first subset (also referred to herein as a base sample) by sampling C chunks from the data set (C is a "constant"—a relatively small number, independent of the dataset size). In some embodiments, the same hash value can appear more than once in the base sample.

In a first calculation step 56, processor 24 uses a hash function to calculate a base hash value for each of the logical data units in the base sample, and in an initialization step 58, the processor initializes hash value duplication histogram 36 that indicates respective number of observations 42 for each of the calculated base hash values (i.e., hash values 40). In a first access step 60, processor 24 accesses the first logical data unit 32 in the sample subset, and in a second calculation step 62, the processor uses the hash function to calculate a unit hash value for the accessed logical data unit.

In a first comparison step 64, if the unit hash value calculated in step 62 matches a given hash value 40 in hash value duplication histogram 36, then in an increment step 66, processor 24 increments the number of observations that corresponds to the given hash value in the hash value duplication histogram, and in a second comparison step 68, the processor checks if there are additional logical data units 32 in the sample subset that have not been processed (i.e., by step 64). Returning to step 64, if the unit hash value calculated in step 62 does not match any of the hash values in hash value duplication histogram 36, then the method proceeds directly to step 68.

Therefore, in embodiments of the present invention, processor 24 can generate first hash value duplication histogram 36 by:

Sampling a p fraction (i.e., the second sample) of the chunks and iterate over all the chunks in the sample.

Recording a histogram (duplication counts) for all the chunks in the base sample (and ignore the rest).

Denoting by $c_j$ the duplication count of the $j^{th}$ chunk in the base sample ($j \in \{1, \ldots, C\}$).

In second comparison step 68, if there are additional logical data units 32 in the sample subset that have not been processed (i.e., by step 64), then processor 24 accesses the next unprocessed logical data unit (i.e., in the sample subset) in a second access step 70. Continuing from step 68, in an extrapolation step 72, processor 24 extrapolates duplication frequency histogram 38 from hash value duplication histogram 36.

In the base sample approach, extrapolated sample duplication frequency histogram 38 comprises an estimated duplication frequency histogram of duplication counts 44 for the sample subset. To estimate sample duplication frequency histogram 38, processor 24 can use the following formula:

$$\forall i, y_i = \frac{|\{j \mid c_j = i\}|}{i} \frac{pN}{C}. \quad (2)$$

In other words, equation (2) uses the number of logical data units 32 in the base sample that had count i, extrapolated to the entire second sample. The crux of this first embodiment is that hash value duplication histogram 36 comprises a low-memory histogram that can produce a good approximation to duplication frequency histogram of the entire dataset. This is because the base sample was representative of the histogram of the logical data units in the entire dataset.

Finally, in an estimation step 74, based on sample duplication frequency histogram 38, processor 24 estimates a number of distinct logical data units 32 in dataset 48, and the method ends. To estimate the number of distinct logical data units 32 in dataset 48, processor 24 derives, based on the sampling ratio and sample histogram 38, a target function, derives optimal duplication frequency histogram 39 that minimizes the target function, the optimal duplication frequency histogram comprising respective number of observations 48 (i.e., predicted frequencies) for predicted duplication counts 47 of the full range of the hash values in the full set, and computes the number of distinct logical data units based on the optimal duplication frequency histogram. Additional details for estimating the number of distinct logical data units 32 in dataset 48 based on sample duplication frequency histogram 38 are described in U.S. Patent Application entitled, "Sampling-Based Deduplication Estimation" referenced above.

As described supra, estimating the number of distinct storage units 32 includes the steps of selecting a set of target hash values and using hash value duplication frequency histogram (also referred to herein as a first histogram) to estimate the number of distinct logical data units in the full set. In the base sample approach, processor 24 selects the set of the target hash values by calculating respective hash values for logical data units 32 in the base sample, and estimates the number of distinct logical data units 32 by extrapolating, based on the observed hash value duplication histogram 36, sample duplication frequency histogram 38 (also referred to herein as a second histogram) indicating respective frequencies (i.e., observations 46) of duplication counts 44 of the full range of the hash values in the sample set, deriving, based on the sampling ratio and the sample duplication frequency histogram, a target function, deriving an optimal duplication frequency histogram 39 (also referred to herein as a third histogram) that minimizes the target function, the optimal duplication frequency histogram comprising respective predicted frequencies (i.e., observations 48) for predicted duplication counts 47 of the full range of the hash values in the full set, and estimating the number of distinct logical data units 32 in the full setbased on the optimal duplication frequency histogram.

One shortcoming of the base sample approach is that the dataset to be studied needs to be set in advance, since otherwise, the base sample will not cover all of it. In terms of distribution and parallel execution, the base sample stage needs to be finished and finalized before running the actual sampling phase which is the predominant part of the analysis (this main phase can then be easily parallelized). To overcome this shortcoming we present a second embodiment that is more dynamic and amenable to parallelism, yet less tight.

Figure 3:
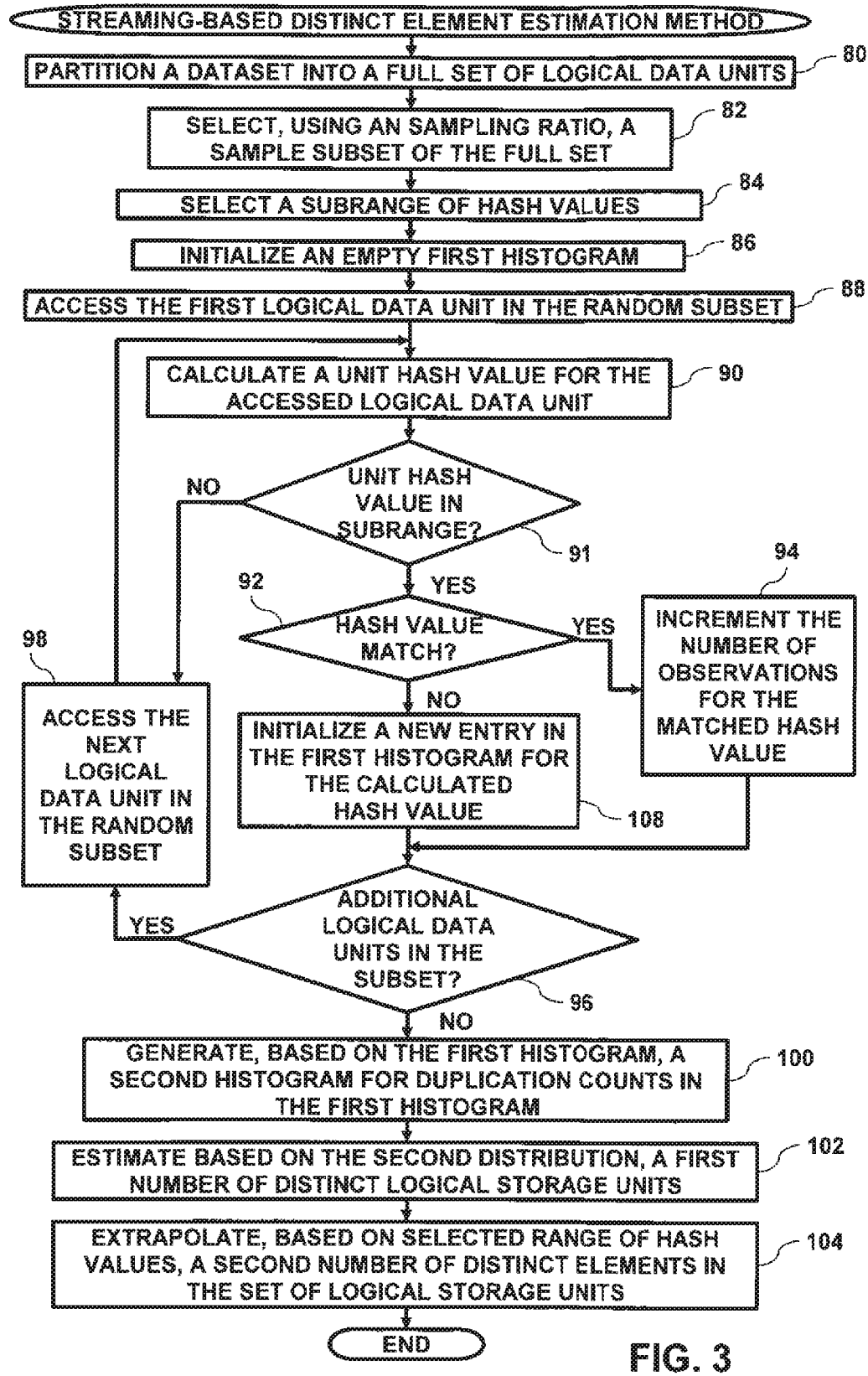
FIG. 3 is a flow diagram that schematically illustrates a method for low memory sampling-based estimation of distinct elements, in accordance with a second embodiment of the present invention.

FIG. 3 is a flow diagram that schematically illustrates a method for low memory sampling-based estimation of a number of distinct logical data units 32 in dataset 48, in accordance with a second embodiment of the present invention. The second embodiment described in the flow diagram shown in FIG. 3 is also referred to herein as a streaming approach.

In an identification step 80, processor 24 partitions dataset 48 into a full set of logical data units 32, and in a first selection step 82, the processor selects, using a defined sampling ratio, a sample subset of the logical data units. In a second selection step 84, based on available memory 26, processor 24 selects, from a full range of hash values, a subrange of the full range of the hash values. Based on a hashing calculation used in the second embodiment, processor 24 can identify a lowest possible hash value and a highest calculated hash value. In some embodiments, the subrange of the hash values comprises the C highest hash values. In embodiments described herein, fraction of the hash domain that was covered by the C samples can be denoted by δ. Namely, if the hashes are calibrated to be numbers in the range [0,1] then δ comprises the distance between one and the lowest hash in the top-C histogram.

In a first initialization step 86, processor 24 initializes hash value duplication histogram 36 that will be used to indicate respective observation counts 42 for each of the calculated hash values (i.e., hash values 40). Upon initializing hash value duplication histogram 36, the hash value duplication histogram is empty.

In a first access step 88, processor 24 accesses the first logical data unit 32 in the random set of the logical data units, and in a first calculation step 90, the processor uses a hash function calculates a unit hash value for the accessed logical data unit. In a first comparison step 91, if the unit hash value calculated in step 90 is within the subrange of the hash values, then in a second comparison step 92, processor 24 checks if the calculated unit hash value matches a given hash value 40 in hash value duplication histogram 36. if the unit hash value calculated in step 90 matches a given hash value 40 in hash value duplication histogram 36, then in an increment step 94, processor 24 increments the number of observations that corresponds to the given hash value in the hash value duplication histogram, and the method continues with step 96 described hereinbelow.

In step 92, if the unit hash value calculated in step 90 does not match any of the hash values in hash value duplication histogram 36, then in a second initialization step 108, processor 24 initializes a new entry in hash value duplication histogram 36, and the method continues with step 96. To initialize the new entry, processor 24 can add a new hash value comprising the calculated hash value, and set the corresponding number of observations 42 to "1". Returning to step 91, if the unit hash value calculated in step 90 is not within the subrange of the full range of the hash values, then the method continues with step 98.

In a third comparison step 96 (i.e., continuing from either step 94 or step 108), if there are additional logical data units 32 in the sample subset that have not been processed (i.e., by step 92), then in a second access step 98, processor 24 accesses the next unprocessed logical data unit in the sample set.

Returning to step 96, if there are additional logical data units 32 in the sample set that have not been processed (i.e., by step 92), then using embodiments described in U.S. Patent Application entitled, "Sampling-Based Deduplication Estimation" referenced above, in a generation step 100, processor 24 uses hash value duplication histogram 36 to generate (i.e., compute) sample duplication frequency histogram 38 (i.e., of the subrange of the full range of the target hash values in the full set). In operation, processor 24 can generate sample duplication frequency histogram 38 solely of the C top hashes, and then estimate a number d of distinct elements in the subrange of the hash values.

In an estimation step 102, processor 24 estimates, based on sample duplication frequency histogram 38, a first number of distinct storage units 32 for the full set of the logical storage units 32 whose respective unit hash values are in the subrange of the full range of the hash values. To estimate the first number of distinct storage units 32 based on sample duplication frequency histogram 38, processor 24 derives, based on the sampling ratio and the sample duplication frequency histogram, a target function, deriving optimal duplication frequency histogram 39 that minimizes the target function, the optimal duplication frequency histogram comprising respective predicted frequencies (i.e., observations 48) for predicted duplication counts 47 of the subrange of the hash values in the full set, and estimating, based on the third histogram, the first number of distinct logical data units. Additional details for estimating the number of distinct logical data units 32 in dataset 48 based on sample duplication frequency histogram 38 are described in U.S. Patent Application entitled, "Sampling-Based Deduplication Estimation" referenced above.

Finally, in an extrapolation step 104, processor 24 extrapolates, based on the subrange of the hash values and the full range of the hash values, a second number of distinct logical data units 32 (in the full set based on the subrange of the hash values (i.e., compared to the full range of valid hash values, and the method ends. In some embodiments processor 24 can extrapolate the second number of distinct logical data units 32 using the following formula:

$$r = d/(\delta \cdot N) \quad (3)$$

As described supra, estimating the number of distinct storage units 32 includes the steps of selecting a set of target hash values and using hash value duplication frequency histogram (i.e., the first histogram) to estimate the number of distinct logical data units in the full set. In the streaming approach, processor 24 selects the set of the target hash values by selecting a subrange of the full range of the hash values, and estimates the number of distinct logical data units in the full set by computing, based on the observed hash value duplication histogram 38, sample duplication frequency histogram 38 indicating respective frequencies 46 of duplication counts 44 of the hash values within the subrange that match respective unit hash values in the sample subset, deriving, based on the sampling ratio and the sample duplication frequency histogram, a target function, deriving optimal duplication frequency histogram 39 that minimizes the target function, the optimal duplication frequency histogram comprising respective predicted frequencies 48, for the full set, of predicted duplication counts 47 of the unit hash values within the subrange, estimating, based on the optimal duplication frequency histogram, a first number of distinct logical data units 32 in the subrange, and extrapolating, based on a ratio between the subrange and the full range of the hash values, a second number of distinct logical data units 32 for the full set, wherein the estimated number of the distinct logical data units comprises the second number of the distinct logical data units.

In the sample approach, processor 24 populates hash value duplication histogram 36 with hash values 40 within the range of the target hash values. In operation (especially in low memory environment), processor 24 may detect that the number of hash values 40 in hash value duplication histogram 36 exceeds a threshold (i.e., which may exhaust memory). In these cases, processor 24 can reduce the range of the target hash values, and remove any hash values 40 and their corresponding number of observations 42 from hash value duplication histogram 36. For example, processor 24 can reduce the range of the target hash values by maintaining a specified (i.e., constant) number of the "smallest" (i.e., e.g., the 20,000 lowest) unit hash values calculated in step 90. Therefore, the number of the target hash values will never exceed the specified number.

Unlike the base sample approach, the streaming approach does not attempt to estimate the duplication frequency histogram of the selected random sample of logical data units 32. Instead, the streaming approach uses an exact duplication frequency histogram 38 of a small δ fraction of the hash domain. The algorithm (also referred to herein as an estimation algorithm) in U.S. Patent Application entitled "Sampling-Based Deduplication Estimation", referenced above, then serves as a means of estimating the actual number of distinct hashes in this sized portion of the hash domain. The result can then be extrapolated from the number of distinct logical data units in a small hash domain, to the number of hashes in the entire domain (i.e., all the logical data units in dataset 48). This relies on the fact that hashes should be evenly distributed over the entire range, and a δ fraction of the domain should hold approximately a δ portion of the distinct hashes.

The problem here is that the estimation algorithm runs on a very small fraction of the dataset. Therefore, when limiting the input of the estimation algorithm to such a small domain (in some of our tests the domain is reduced by a factor of more than 20,000) then the tightness of the estimation can suffer.

On the other hand, the streaming approach is much simpler to use in parallel environments where each node can run his sample independently and at the end all results are merged and a single estimation execution is run. Another benefit is that processor 24 can perform an estimation on a certain set of logical volumes in the storage system, and store the low-memory histogram. Then, at a later stage, new logical volumes can be scanned and merged with the existing results to get an updated estimation. Although the streaming approach requires a larger sample in order to reach the same level of accuracy, there are scenarios where the base sample method cannot be used and this method can serve as a good fallback option.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of determining a number of distinct logical data units in a dataset, comprising:
   randomly selecting, from a dataset partitioned into a set of logical data units, a number of logical data units determined by a specified sampling ratio, to serve as a sample subset of the set of logical data units;
   specifying a range of hash values;
   calculating, by a processor, respective unit hash values for each of the logical data units in the sample subset;
   computing a first histogram indicating a duplication count in the sample subset, of logical data units whose respective calculated unit hash values are in the specified range;
   deriving, from the first histogram, a second histogram indicating respective frequencies of the duplication counts in the first histogram;
   deriving, for the logical data units in the dataset, a third histogram of predicted duplication counts of predicted frequencies of the unit hash values within the specified range of hash values, by performing an optimization method, with a target function that minimizes a distance between the second histogram and the result of applying a sampling transformation with the specified sampling ratio on candidate third histograms; and
   determining, based on the third histogram, a number of distinct logical data units in the dataset.

2. The method according to claim 1, and comprising deciding, based on the determined number of distinct logical data units, whether or not to perform deduplication on the dataset.

3. The method according to claim 1, and comprising prior to deriving the third histogram, deriving, based on the second histogram and the sampling ratio, the target function.

4. The method according to claim 1, wherein specifying the target range of hash values comprises identifying a full range of hash values for the logical data units in the dataset, and selecting a subrange of the full range, wherein the specified range comprises the subrange.

5. The method according to claim 4, wherein determining, based on the third histogram, the number of distinct logical data units in the dataset comprises estimating, based on the third histogram, a number of distinct logical data units in the dataset that are in the specified range of hash values, and extrapolating, based on a ratio between the subrange and the full range of the hash values, the number of distinct logical data units in the dataset that are in the full range of hash values.

6. The method according to claim 1, and comprising reducing the specified range of hash values in response to detecting, while computing the first histogram, a number of distinct unit hash values in the first histogram exceeding a predefined threshold, and recomputing the first histogram based on the reduced range.

7. The method according to claim 6, wherein reducing the specified range of hash values comprises maintaining a specified constant number of unit hash values calculated for the sample subset having lowest values.

8. An apparatus for determining a number of distinct logical data units in a dataset, comprising, comprising:
   a storage device configured to store a dataset partitioned into a set of logical data units; and
   a processor configured:
      to randomly select, from the dataset, a number of logical data units determined by a specified sampling ratio, to serve as a sample subset of the set of logical data units,
      to specify a range of hash values,
      to calculate respective unit hash values for each of the logical data units in the sample subset,
      to compute a first histogram indicating a duplication count in the sample subset, of logical data units whose respective calculated unit hash values are in the specified range,
      to derive, from the first histogram, a second histogram indicating respective frequencies of the duplication counts in the first histogram,
      to derive, for the logical data units in the dataset, a third histogram of predicted duplication counts of predicted frequencies of the unit hash values within the specified range of hash values, by performing an optimization method, with a target function that minimizes a distance between the second histogram and the result of applying a sampling transformation with the specified sampling ratio on candidate third histograms, and
      to determine, based on the third histogram, a number of distinct logical data units in the dataset.

9. The apparatus according to claim 8, wherein the processor is configured to decide, based on the determined number of distinct logical data units, whether or not to perform deduplication on the dataset.

10. The apparatus according to claim 8, wherein prior to deriving the third histogram, the processor is configured to derive, based on the second histogram and the sampling ratio, the target function.

11. The apparatus according to claim 8, wherein the processor is configured to specify the target range of hash values by identifying a full range of hash values for the by data units in the dataset, and selecting a subrange of the full range, wherein the specified range comprises the subrange.

12. The apparatus according to claim 11, wherein the processor is configured to determine, based on the third histogram, the number of distinct logical data units in the dataset by estimating, based on the third histogram, a number of distinct logical data units in the dataset that are in the specified range of hash values, and extrapolating, based on a ratio between the subrange and the full range of the hash values, the number of distinct logical data units in the dataset that are in the full range of hash values.

13. The apparatus according to claim 8, wherein the processor is configured to reduce the specified range of hash values in response to detecting, while computing the first histogram, a number of distinct unit hash values in the first histogram exceeding a predefined threshold, and recomputing the first histogram based on the reduced range.

14. The apparatus according to claim 13, wherein the processor is configured to reduce the specified range of hash values by maintaining a specified constant number of unit hash values calculated for the sample subset having lowest values.

15. A computer program product for determining a number of distinct logical data units in a dataset, the computer program product comprising:
 a non-transitory computer readable storage medium having computer readable program code embodied therewith, the computer readable program code comprising:
 computer readable program code configured to randomly select, from a dataset partitioned into a set of logical data units, a number of logical data units determined by a specified sampling ratio, to serve as a sample subset of the set of logical data units;
 computer readable program code configured to specify a range of hash values;
 computer readable program code configured to calculate respective unit hash values for each of the logical data units in the sample subset;
 computer readable program code configured to compute a first histogram indicating a duplication count in the sample subset, of logical data units whose respective calculated unit hash values are in the specified range;
 computer readable program code configured to derive, from the first histogram, a second histogram indicating respective frequencies of the duplication counts in the first histogram;
 computer readable program code configured to derive, for the logical data units in the dataset, a third histogram of predicted duplication counts of predicted frequencies of the unit hash values within the specified range of hash values, by performing an optimization method, with a target function that minimizes a distance between the second histogram and the result of applying a sampling transformation with the specified sampling ratio on candidate third histograms; and
 computer readable program code configured to determine, based on the third histogram, a number of distinct logical data units in the dataset.

16. The computer program product according to claim 15, and comprising deciding, based on the determined number of distinct logical data units, whether or not to perform deduplication on the dataset.

17. The computer program product according to claim 15, wherein the computer readable program code is configured to specify the target range of hash values by identifying a full range of hash values for the logical data units in the dataset, and selecting a subrange of the full range, wherein the specified range comprises the subrange.

18. The computer program product according to claim 17, wherein the computer readable program code is configured to determine, based on the third histogram, the number of distinct logical data units in the dataset by estimating, based on the third histogram, a number of distinct logical data units in the dataset that are in the specified range of hash values, and extrapolating, based on a ratio between the subrange and the full range of the hash values, the number of distinct logical data units in the dataset that are in the full range of hash values.

19. The computer program product according to claim 15, and comprising computer readable program code configured to reduce the specified range of hash values in response to detecting, while computing the first histogram, a number of distinct unit hash values in the first histogram exceeding a predefined threshold, and recomputing the first histogram based on the reduced range.

20. The computer program product according to claim 15, wherein the computer readable program code is configured to reduce the specified range of hash values by maintaining a specified constant number of unit hash values calculated for the sample subset having lowest values.

* * * * *